United States Patent
Li et al.

(10) Patent No.: US 11,451,823 B2
(45) Date of Patent: Sep. 20, 2022

(54) METHOD AND APPARATUS FOR VIDEO CODING

(71) Applicant: TENCENT AMERICA LLC, Palo Alto, CA (US)

(72) Inventors: Guichun Li, Milpitas, CA (US); Xiaozhong Xu, State College, PA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/409,938

(22) Filed: Aug. 24, 2021

(65) Prior Publication Data

US 2021/0385489 A1    Dec. 9, 2021

Related U.S. Application Data

(63) Continuation of application No. 16/875,629, filed on May 15, 2020, now Pat. No. 11,146,813.
(Continued)

(51) Int. Cl.
*H04N 19/54* (2014.01)
*H04N 19/61* (2014.01)
(Continued)

(52) U.S. Cl.
CPC ............. *H04N 19/54* (2014.11); *H04N 19/61* (2014.11); *H04N 19/82* (2014.11); *H04N 19/91* (2014.11)

(58) Field of Classification Search
CPC ........ H04N 19/54; H04N 19/61; H04N 19/82; H04N 19/91; H04N 19/159; H04N 19/176; H04N 19/517; H04N 19/105
See application file for complete search history.

(56) References Cited

U.S. PATENT DOCUMENTS

2019/0082191 A1    3/2019  Chuang
2019/0208211 A1    7/2019  Zhang
(Continued)

OTHER PUBLICATIONS

"Versatile Video Coding (Draft 4)", Benjamin Bross, et al., Joint Video Experts Team (JVET) of ITU-T SG 16 WP 3 and ISO/IEC JTC 1/SC 29/WG 11, 13th Meeting: Marrakech, MA, Jan. 9-18, 2019.
(Continued)

*Primary Examiner* — Tracy Y. Li
(74) *Attorney, Agent, or Firm* — ArentFox Schiff LLP

(57) ABSTRACT

Prediction information of a current block is decoded. The prediction information indicates an affine merge model, and the current block includes control points. A first candidate control point motion vector (CPMV) for a first control point of the control points is determined based on one of at least two CPMVs of a first neighboring block of the first control point and a translational motion vector of a second neighboring block of the first control point. Affine merge candidates for the current block are derived based on candidate CPMVs for the control points of the current block. The candidate CPMVs of the control points includes the first candidate CPMV. Parameters of the affine merge model are determined based on one of the affine merge candidates that is defined according to the prediction information. At least a sample of the current block is reconstructed according to the affine merge model.

13 Claims, 16 Drawing Sheets

Related U.S. Application Data

(60) Provisional application No. 62/852,141, filed on May 23, 2019.

(51) Int. Cl.
    *H04N 19/82*    (2014.01)
    *H04N 19/91*    (2014.01)

(56) References Cited

U.S. PATENT DOCUMENTS

| | | |
|---|---|---|
| 2019/0222834 A1 | 7/2019 | Chen |
| 2019/0327482 A1* | 10/2019 | Lin ................ H04N 19/176 |
| 2020/0077113 A1 | 3/2020 | Huang |
| 2020/0288175 A1* | 9/2020 | Chang ............... H04N 19/52 |
| 2022/0070448 A1* | 3/2022 | Kim ................ H04N 19/176 |

OTHER PUBLICATIONS

"Series H: Audiovisual and Multimedia Systems Infrastructure of audiovisual services—Coding of moving video", High efficiency video coding, Recommendation ITU-T H.265, Dec. 2016.

\* cited by examiner

METHOD AND APPARATUS FOR VIDEO CODING

CROSS-REFERENCE TO RELATED APPLICATIONS

This application is a continuation of and claims the benefit of priority under 35 U.S.C. § 120 from U.S. application Ser. No. 16/875,629 filed May 15, 2020, which claims the benefit of priority from U.S. Provisional Application No. 62/852,141 filed May 23, 2019, the entire contents of each of which are incorporated herein by reference.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry.

According to an aspect of the disclosure, a method for video decoding is provided in a decoder. In the method, prediction information of a current block in a current picture is decoded from a coded video bitstream. The prediction information is indicative of an affine merge model, and the current block includes control points. A first candidate control point motion vector (CPMV) for a first control point of the control points is determined based on one of (i) at least two CPMVs of a first neighboring block of the first control point and (ii) a translational motion vector (MV) of a second neighboring block of the first control point. Affine merge candidates for the current block are derived based on candidate CPMVs for the control points of the current block, where the candidate CPMVs of the control points includes the first candidate CPMV. Parameters of the affine merge model are determined based on one of the affine merge candidates, and the one of the affine merge candidates is defined according to the prediction information. The parameters of the affine merge model are used to transform between the current block and a reference block in a reference picture that has been reconstructed. At least a sample of the current block is reconstructed according to the affine merge model.

In some embodiments, the prediction information indicates a selection of the affine merge candidates, and the method further includes defining the one of the affine merge candidates in accordance with the prediction information.

In some embodiments, in order to determine the first candidate CPMV for the first control point, in an example, the first candidate CPMV for the first control point can be determined based on at least two CPMVs of a first affine coded block among neighboring blocks of the first control point according to a checking order. In another example, the first candidate CPMV for the first control point is determined based on a translational MV of a first available block among the neighboring blocks of the first control point according to the checking order, responsive to none of the neighboring blocks of the first control point being affine coded.

In some embodiments, a second candidate CPMV for a second control point of the control points can be determined by copying a translational MV of a temporal motion vector predictor.

The control points of the current block can be derived from 2 or 3 of four candidate control points of the current block. The first candidate CPMV of the first control point of the control points can be derived from the at least two CPMVs of the first neighboring block of the first control point, and a second candidate CPMV of a second control point of the control points can be derived by copying a translational MV of a temporal motion vector predictor.

In some embodiments, the control points of the current block can be derived from 2 or 3 of three candidate control points, and the first candidate CPMV of the first control point of the control points can be derived from the at least two CPMVs of the first neighboring block of the first control point.

In some embodiments, the candidate CPMVs of at least two of the control points of the current block are derived from CPMVs of neighboring blocks of the at least two of the control points.

In some embodiments, the first candidate CPMV of the first control point of the current block is derived from the at least two CPMVs of the first neighboring block of the first control point, and a candidate CPMV of each remaining control point of the current block is derived from at least two CPMVs of a neighboring block of the respective control point.

In some embodiments, each of the candidate CPMVs of the control points of the current block refers to the reference picture.

In some embodiments, the first neighboring block of the first control point is a largest affine coded block of neighboring affine coded blocks of the first control point. The first candidate CPMV for the first control point can be determined based on the at least two CPMVs of the largest affine coded block of the neighboring affine coded blocks of the first control point.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
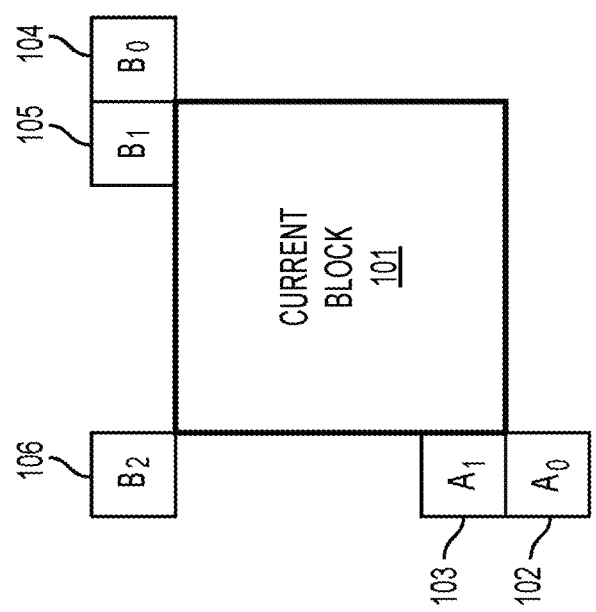
FIG. 1 is a schematic illustration of a current block and its surrounding spatial merge candidates in one example.
Figure 2:
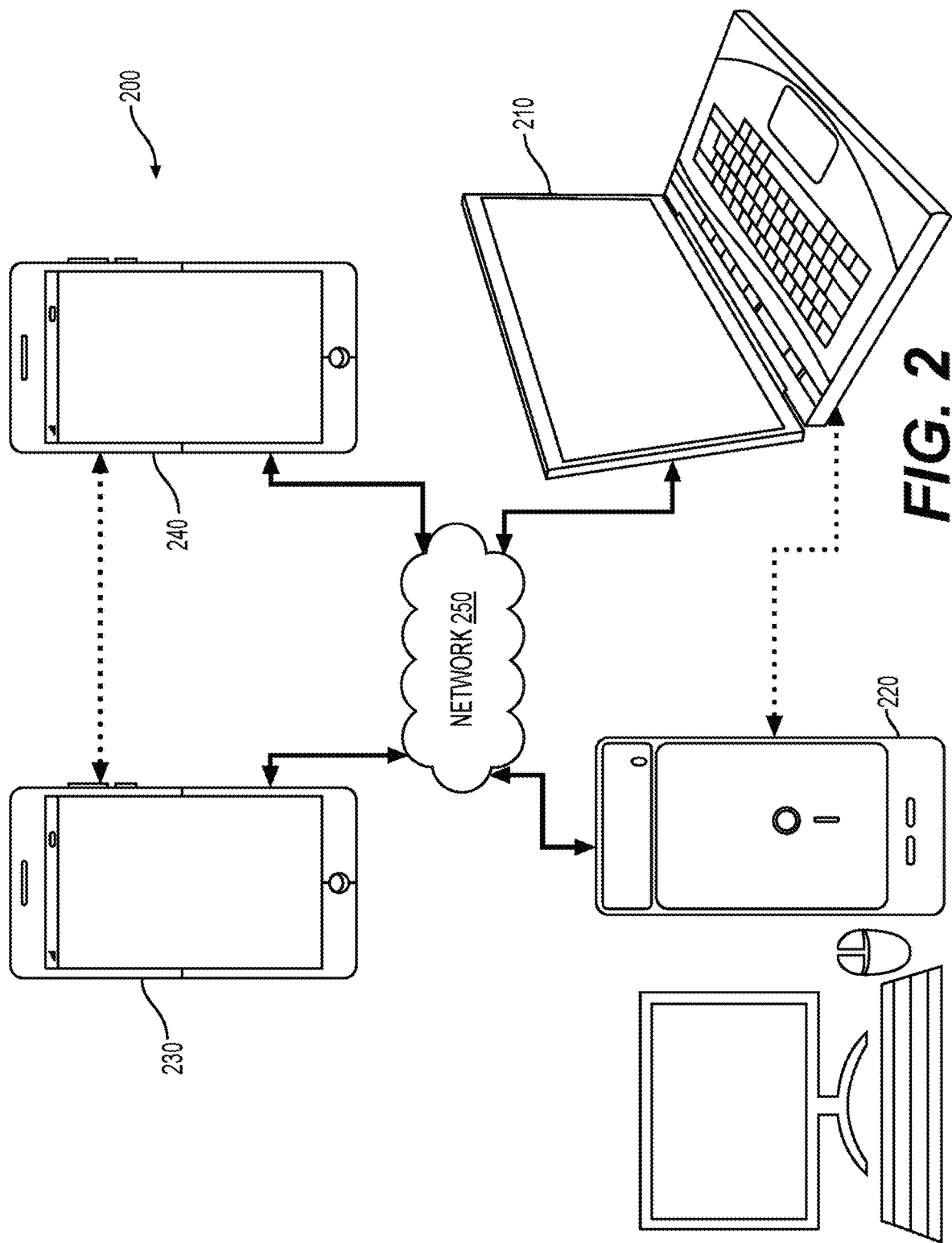
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data.

Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
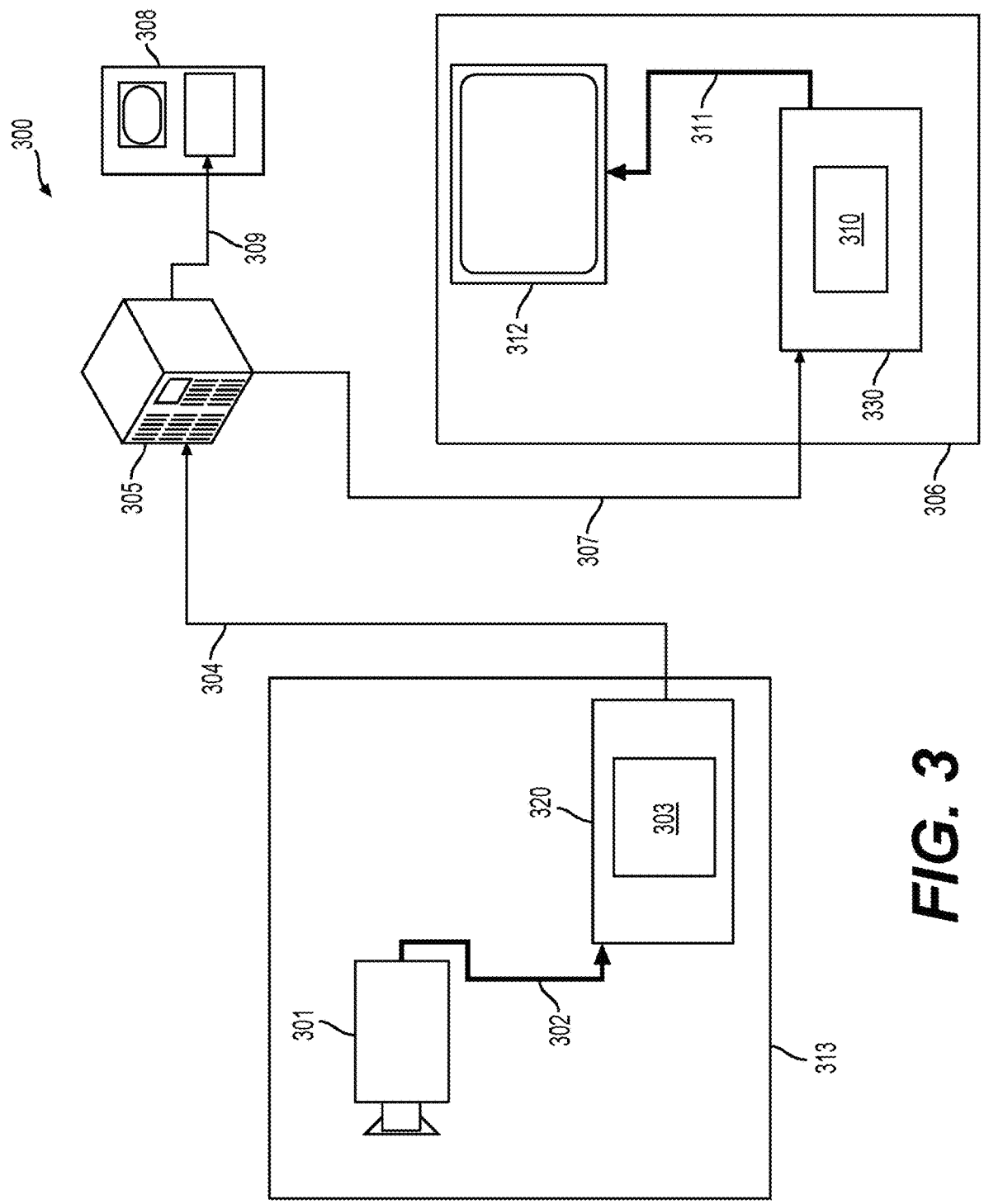
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
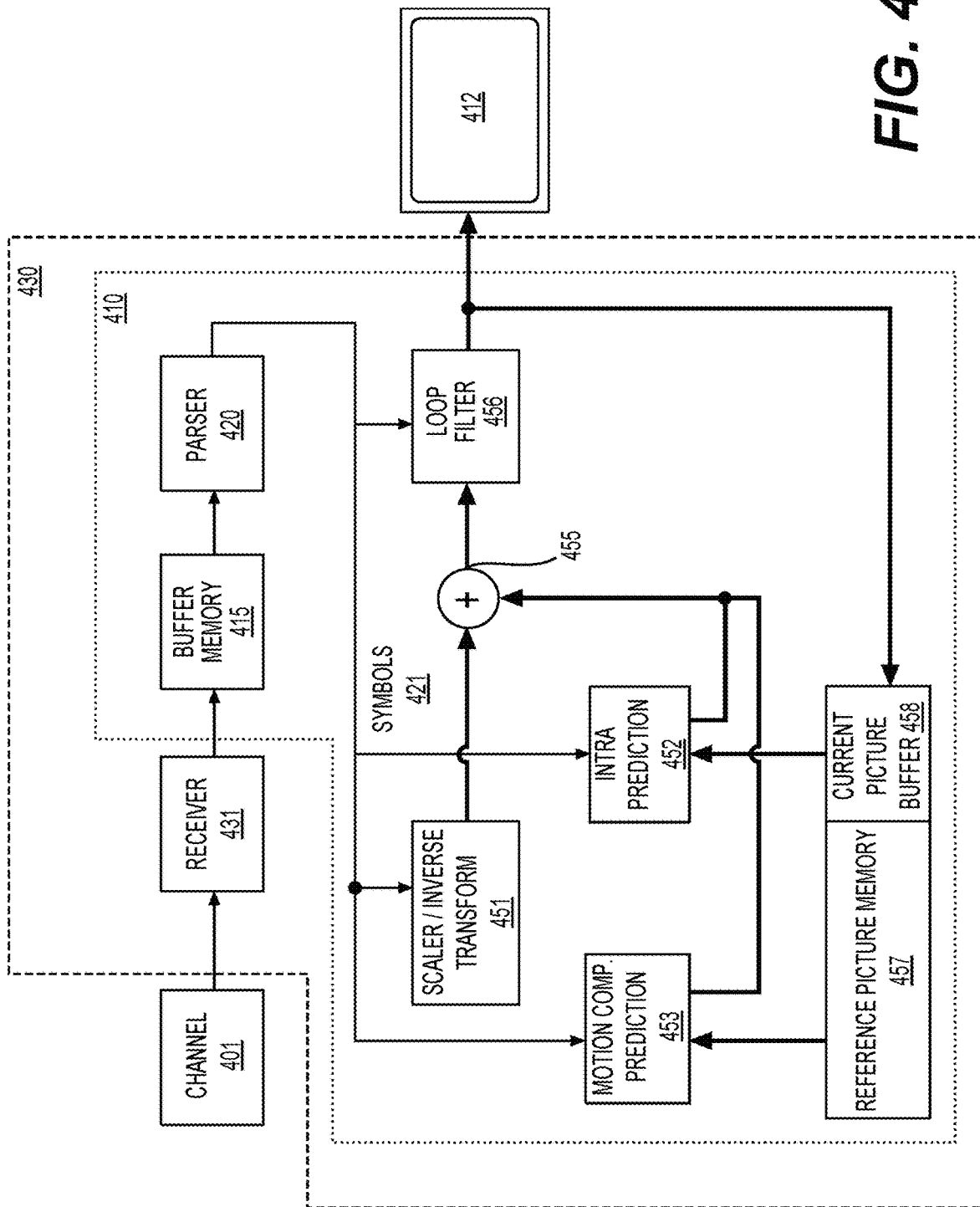
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420)

may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
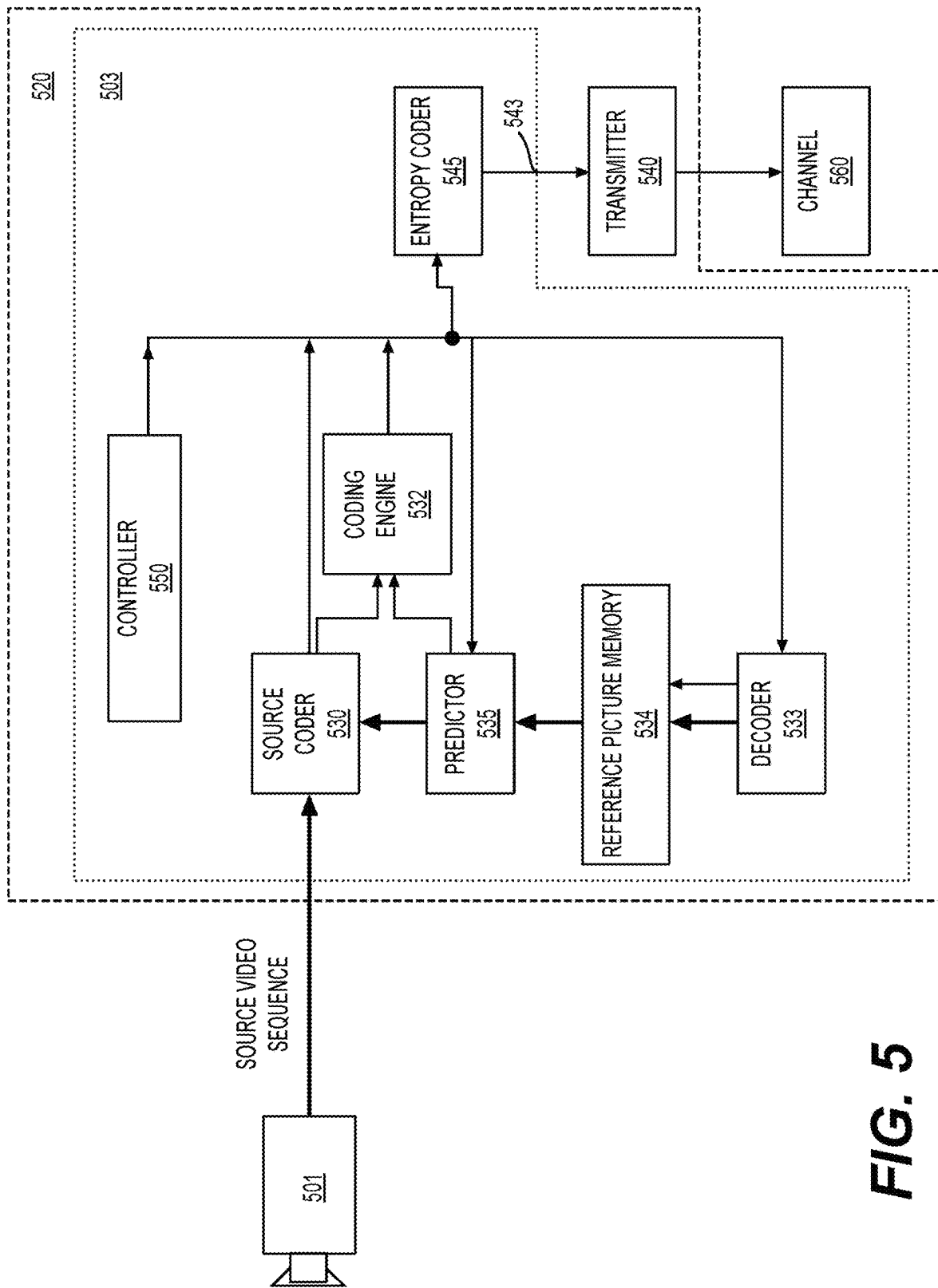
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
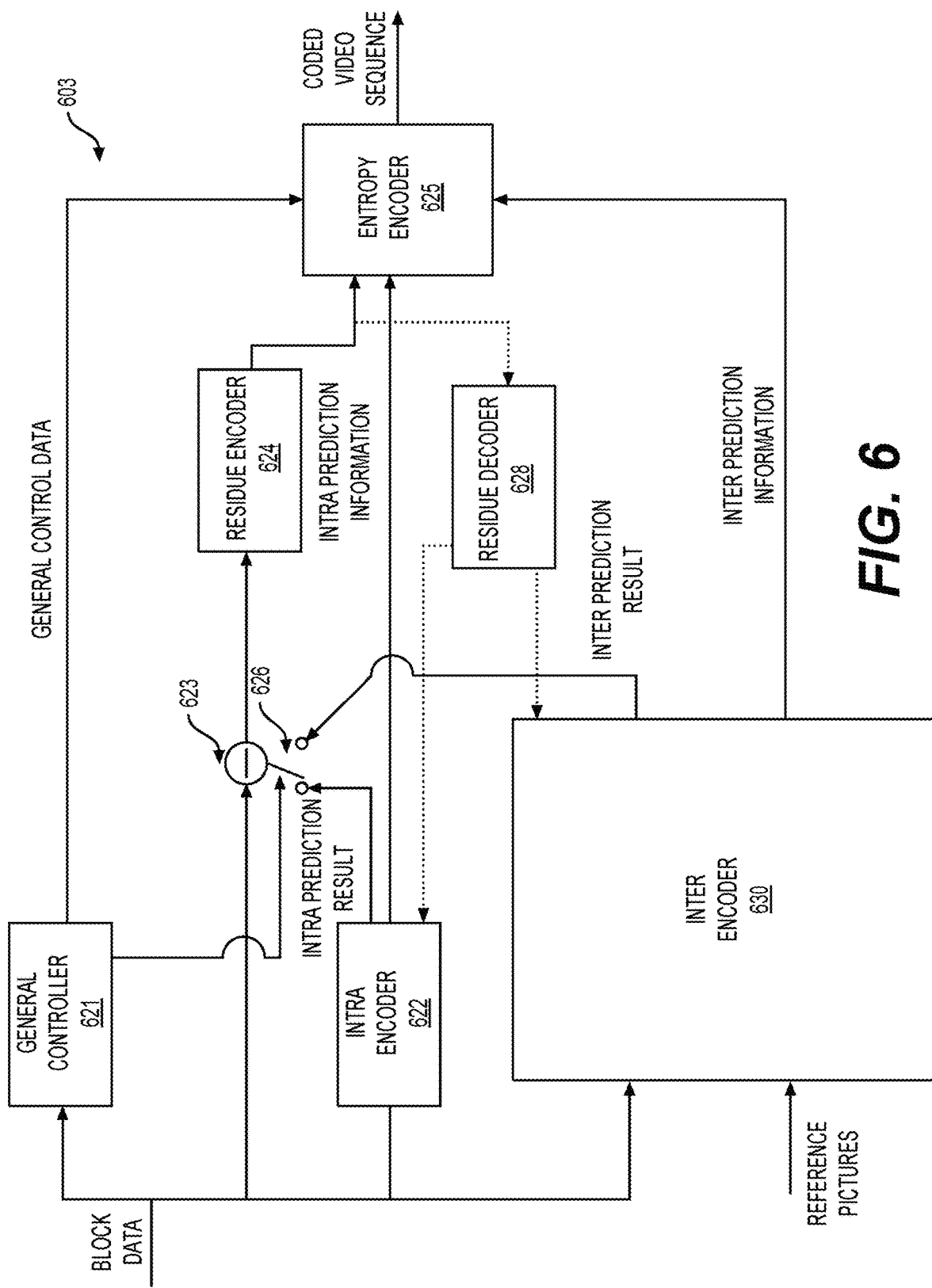
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
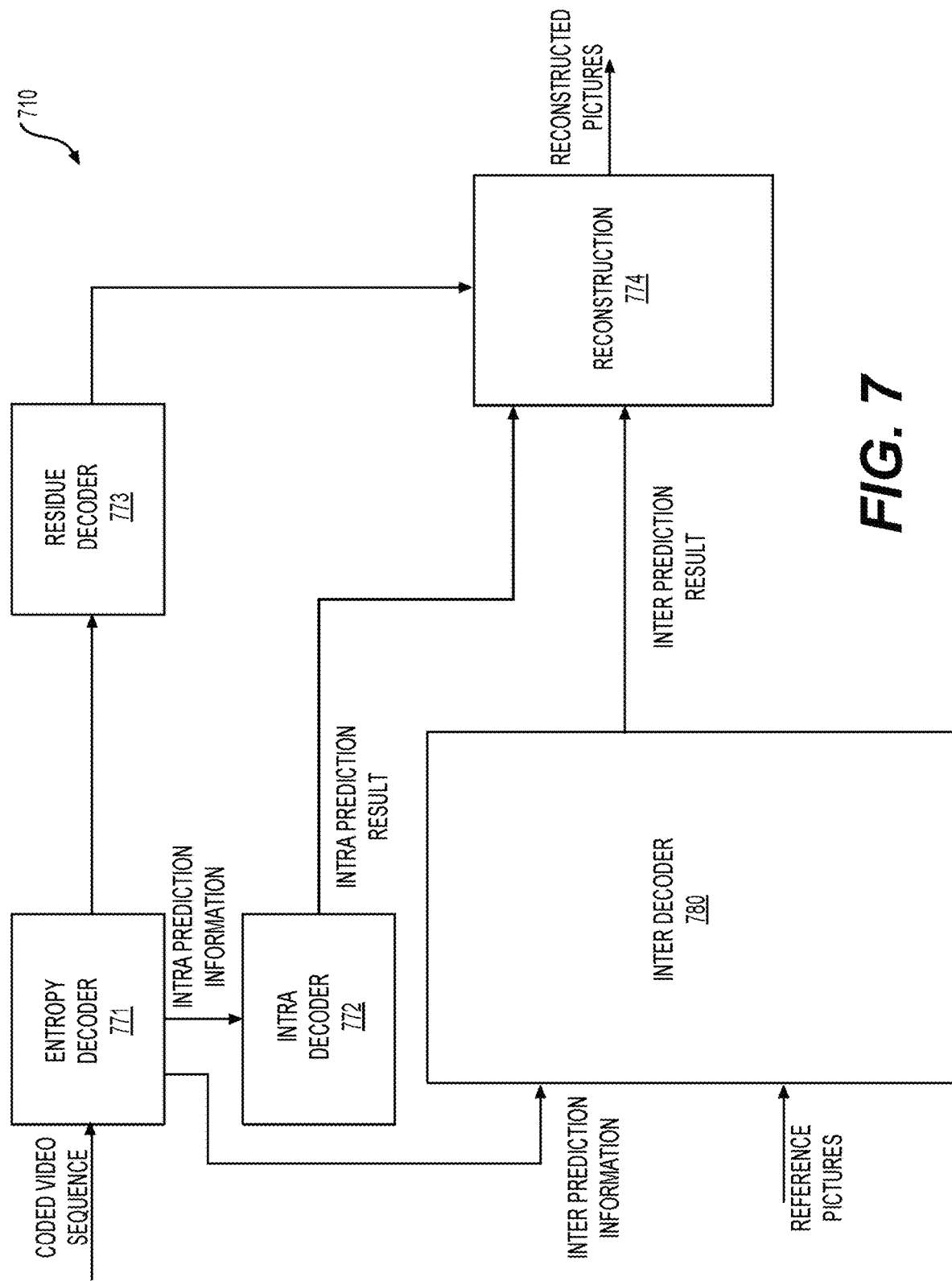
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

The present disclosure is directed to inter prediction in advanced video codec, including methods of generating affine merge candidates.

Figure 8:
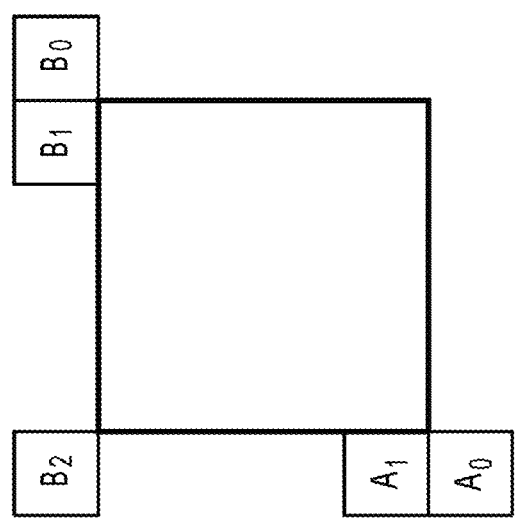
FIG. 8 shows spatial merge candidates in HEVC merge mode, and locations of inherited affine motion predictors in affine merge prediction in accordance with an embodiment.

HEVC can include a merge mode for inter-picture prediction. If a merge flag (including a skip flag) is signaled as true, a merge index is then signaled to indicate which candidate in a merge candidate list can be used to indicate motion vectors of a current block. At a decoder, the merge candidate list is constructed based on spatial and temporal neighbors of the current block. As shown in FIG. 8, up to four spatially neighboring MVs can be added to the merge candidate list. In addition, up to one MV from temporal neighbors of the current block can be added to the merge candidate list.

Additional merge candidates can include a combination of bi-predictive candidates and zero motion vector candidates.

Before the motion information (or motion vectors) of a block is taken as a merge candidate, redundancy checks can be performed to check whether the motion information of the block is identical to an element in the current merge candidate list. If the block is different from each element in the current merge candidate list, the block can be added to the current merge candidate list as a merge candidate. In some embodiments, MaxMergeCandsNum can be defined as a size of a merge candidate list in terms of candidate number. MaxMergeCandsNum can be signaled in a bitstream, such as in HEVC.

In affine merge prediction, an AF_MERGE mode can be applied for CUs with both a width and a height larger than or equal to 8. In affine merge mode, CPMVs of a current CU can be generated based on motion information of spatial neighboring CUs of the current CU. Up to five CPMV candidates can be derived and an index can be signalled to indicate the one to be used for the current CU. The following three types of CPMV candidate can be used to form the affine merge candidate list: (a) inherited affine merge candidates that are extrapolated from the CPMVs of the neighboring CUs; (b) constructed affine merge candidates that are derived using translational MVs of the neighboring CUs; and/or (c) zero MVs.

Affine models can be described by equations (1) and (2). For a 6-parameter affine model, motion vectors of a pixel position at position (x, y) can be described by Eq. (1) with affine parameters a, b, c, d, e, f.

$$\begin{cases} MVx = ax + by + c \\ MVy = dx + ey + f \end{cases} \quad \text{Eq. (1)}$$

For a 4-parameter affine model, motion vectors of the pixel position at position (x, y) can be described by Eq. (2) with affine parameters a, b, c, f.

$$\begin{cases} MVx = ax + by + c \\ MVy = -bx + ay + f \end{cases} \quad \text{Eq. (2)}$$

Figure 9:
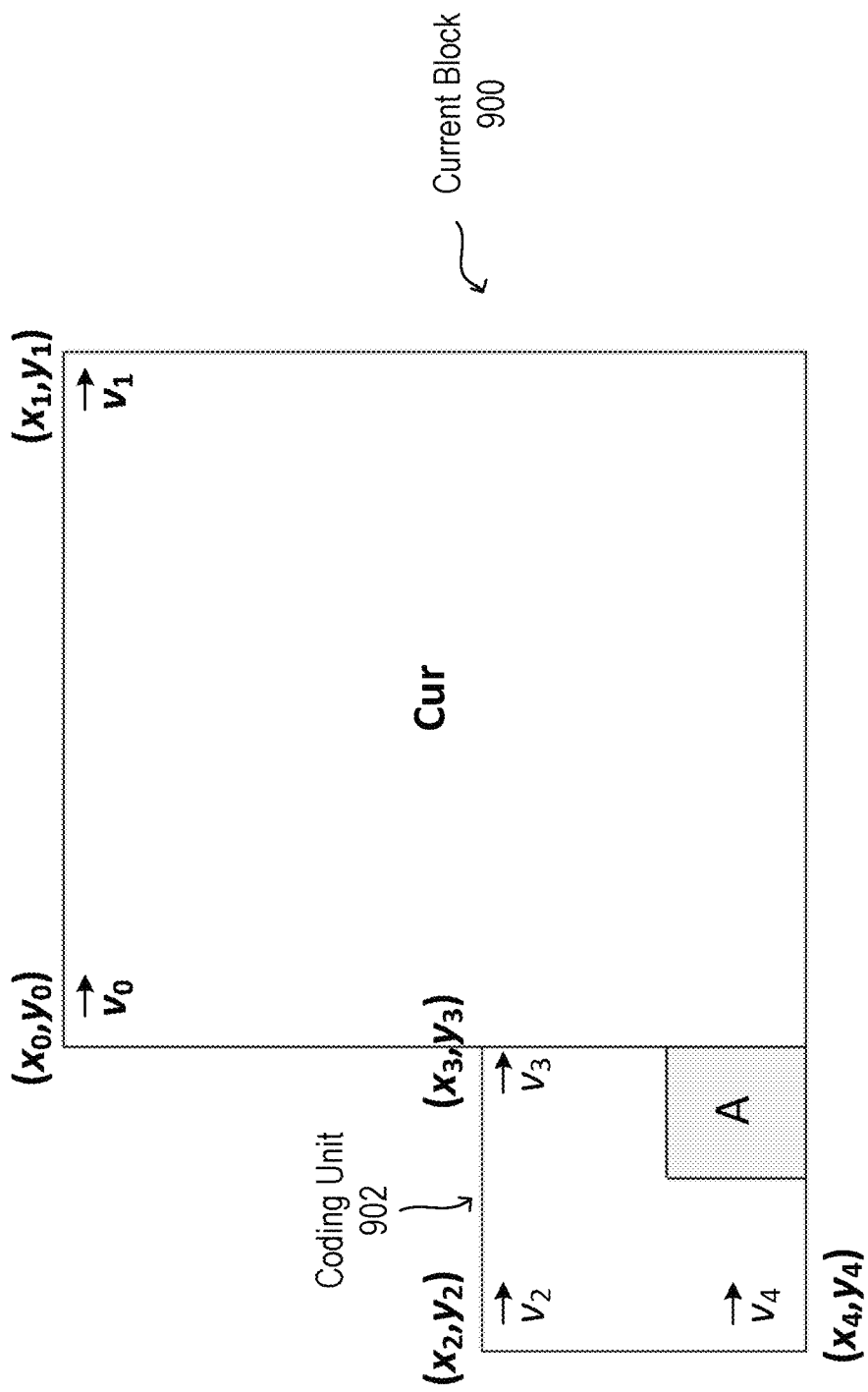
FIG. 9 shows an exemplary embodiment of deriving a control point motion vector (CPMV) for inherited affine merge mode in accordance with an embodiment.

Up to two affine candidates, which can be derived from affine motion models of the neighboring blocks, can be inherited, such as in VTM3. For example, one inherited affine candidate can be derived from left neighboring CUs and the other inherited affine candidate can be derived from above neighboring CUs. Exemplary candidate blocks are shown in FIG. 8. In order to obtain a left predictor, a scan order of A0->A1 can be applied. In order to obtain an above predictor, the scan order can be B0->B1->B2. Only a first inherited candidate from each side (e.g., left side and/or above side) is selected. In addition, no pruning check is performed between two inherited candidates. When a neighboring affine CU is identified, CPMVs of the neighboring affine CU can be used to derive a CPMV candidate in the affine merge list of the current CU. As shown in FIG. 9, if the neighboring left bottom block A is coded in affine mode, motion vectors $v_2$, $v_3$, and $v_4$ of a top left corner, an above right corner, and a left bottom corner of a CU 902 which contains the block A are attained. When block A is coded with a 4-parameter affine model, two CPMVs of the current CU 900 can be calculated according to $v_2$ and $v_3$. In case that block A is coded with a 6-parameter affine model, three CPMVs of the current CU 900 can be calculated according to $v_2$, $v_3$, and $v_4$.

Figure 10:
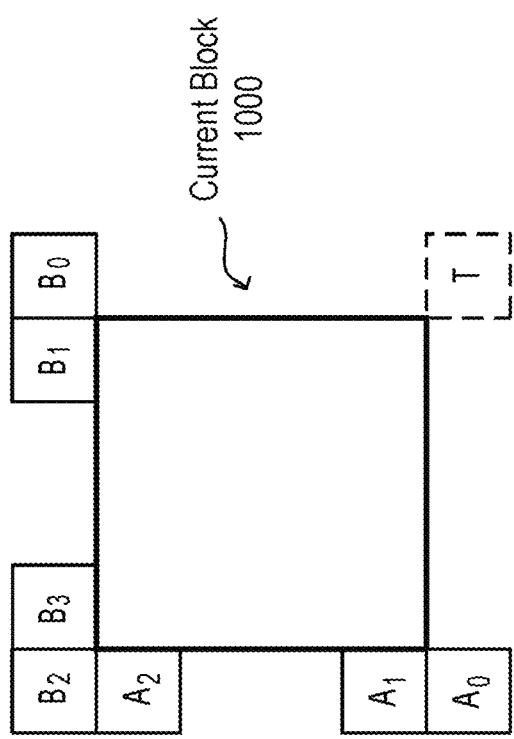
FIG. 10 shows locations of candidates for constructed affine merge mode in accordance with an embodiment.

A constructed affine candidate is a candidate that is constructed by combining neighboring translational motion information of each control point. The motion information for the control points can be derived from specified spatial neighbors and a temporal neighbor of a current block 1000 shown in FIG. 10. $CPMV_k$ (k=1, 2, 3, 4) represents a k-th control point of the current block 1000. For $CPMV_1$, the B2->B3->A2 blocks are checked and the MV of the first available block can be used as the $CPMV_1$. For $CPMV_2$, the B1->B0 blocks are checked. For $CPMV_3$, the A1->A0 blocks are checked. When a temporal motion vector predictor (TMVP) is available, TMVP can be applied as $CPMV_4$.

After MVs of four control points are attained, affine merge candidates can be constructed based on the motion information of the four control points. The following combinations of control point MVs can be used to construct the affine merge candidates sequentially:
{CPMV$_1$, CPMV$_2$, CPMV$_3$}, {CPMV$_1$, CPMV$_2$, CPMV$_4$}, {CPMV$_1$, CPMV$_3$, CPMV$_4$}, {CPMV$_2$, CPMV$_3$, CPMV$_4$}, {CPMV$_1$, CPMV$_2$}, {CPMV$_1$, CPMV$_3$}.

A combination of 3 CPMVs constructs a 6-parameter affine merge candidate and a combination of 2 CPMVs constructs a 4-parameter affine merge candidate. To avoid a motion scaling process, if reference indices of control points are different, the related combination of control point MVs is discarded.

Affine models can also be represented by affine parameters and a base MV. For a 4-parameter affine model, a MV (mv$^h$, mv$^v$) at the position (x, y) can be derived in Eq. (3).

$$\begin{cases} mv^h(x, y) = a(x - x_{base}) - b(y - y_{base}) + mv^h_{base} \\ mv^v(x, y) = b(x - x_{base}) + a(y - y_{base}) + mv^v_{base} \end{cases} \quad \text{Eq. (3)}$$

For a 6-parameter affine model, the MV (mv$^h$, mv$^v$) at the position (x, y) can be derived in Eq. (4).

$$\begin{cases} mv^h(x, y) = a(x - x_{base}) + c(y - y_{base}) + mv^h_{base} \\ mv^v(x, y) = b(x - x_{base}) + d(y - y_{base}) + mv^v_{base} \end{cases} \quad \text{Eq. (4)}$$

where MV$_{base}$ (mv$^h_{base}$, mv$^v_{base}$) is a base MV at a base position (x$_{base}$, y$_{base}$), and (a, b), (a, b, c, d) represent affine parameters for the 4-parameter affine model and 6-parameter affine model, respectively.

The affine parameters can be calculated according to Eq. (5)-(7):

$$a = \frac{(mv^h_1 - mv^h_0)}{Lx}, b = \frac{(mw^v_1 - mv^v_0)}{Lx} \quad \text{Eq. (5)}$$

$$c = \frac{(mv^h_2 - mv^h_0)}{Ly}, d = \frac{(mv^v_2 - mv^v_0)}{Ly}, \quad \text{Eq. (6)}$$

$$Lx = x_1 - x_0, Ly = y_2 - y_0, \quad \text{Eq. (7)}$$

where MV$_0$(mv$_0^h$, mv$_0^v$), MV$_1$ (mv$_1^h$, mv$_1^v$), and MV$_2$ (mv$_2^h$, mv$_2^v$) represent three CPMVs at positions (x$_0$, y$_0$), (x$_1$, y$_1$) and (x$_2$, y$_2$), respectively. (x$_0$, y$_0$), (x$_1$, y$_1$), and (x$_2$, y$_2$) are usually set to be the top-left, top-right, and bottom-left corner of an affine coded block with a size equal to w×h. Accordingly, Lx can be set to be w and Ly can be set to be h.

It should be noted that the base MV does not need to be one of the CPMVs, although the base MV is set to be the MV$_0$ at the top-left corner (x$_0$, y$_0$) in some embodiments, such as in VTM-3.0.

In addition, two methods associated with the affine merge prediction are disclosed. In method 1, problems related to affine inheritance crossing CTU rows can be addressed. In method 2, problems related to affine inheritance inside a CTU can be addressed.

In method 1, for affine inheritance crossing CTU rows, storage of the CU width and the x-component of the bottom-left coordinate of each 8×8 block can be removed from a line-buffer. When a current CU 1100 applies affine inheritance from a neighboring 4×4 block such as B0 in FIG. 11, the 4×4 block right-next to B0 (e.g., B1), or left-next to B0 which is also affine-coded and has a same reference index as B0, can be chosen as B0'. The MVs stored in B0 and B0' are accessed as MVB and MVB'. In addition, MV0 and MV1 are set to be MVB and MVB' to derive a and b by Eq. (5) with Lx=4. CPMVs of the current CU 1100 can be derived by Eq. (3) with the center position of B as the base position and MVB as the base MV.

Figure 11:
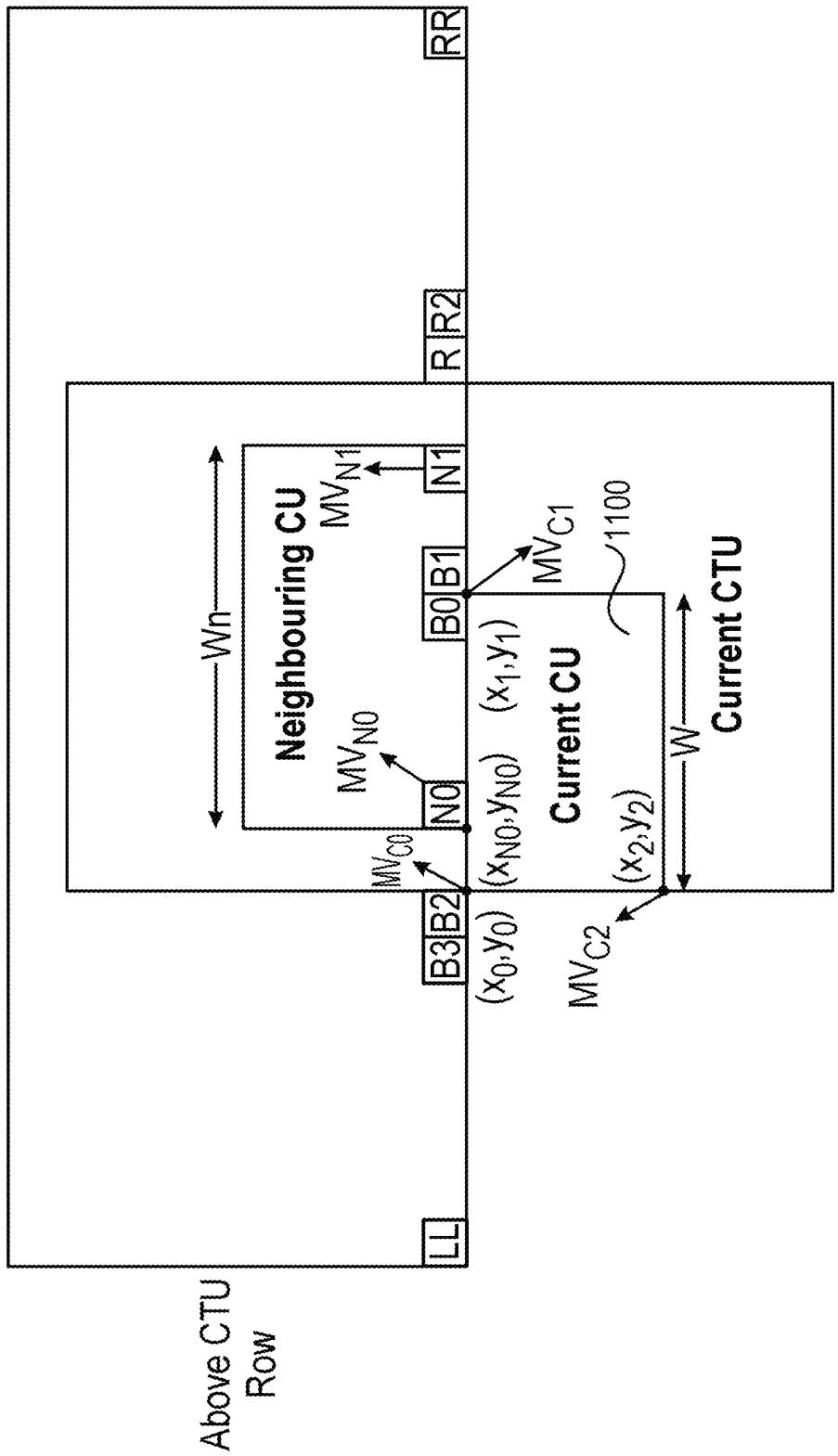
FIG. 11 shows an exemplary embodiment of affine inheritance crossing CTU rows in accordance with an embodiment.

Based on method 1, at most 36 4×4 blocks from B3 to R2 as shown in FIG. 11 can be accessed at a CTU-row boundary. The additional information that needs to be loaded on cache can be reduced from 4464 bits to 2*72=144 bits (or 2*10=20 bytes in a byte-alignment implementation).

In method 2, for affine inheritance inside a CTU row, affine parameters instead of three CPMVs and the block dimensions can be stored. When the current CU applies inherited affine merge mode, affine parameters are directly copied from the neighboring 4×4 block B that is to be inherited. The MV of each sub-block in the current CU can be derived by Eq. (4) with the center position of B as the base position and MVB as the base MV. When the current CU applies affine AMVP mode, CPMVs of the current CU can be derived by Eq. (4) with the center position of B as the base position and MVB as the base MV, and the derived CPMVs can serve as the MVPs.

In addition, each parameter can be stored as an 8-bit signed integer. Therefore 2×4×8=64 bits are required to store affine parameters in each 8×8 block inside a CTU. According to method 2, the In-CTU-buffer can be increased by 48×64=3072 bits (or 48×8=384 bytes in a byte-alignment implementation). In addition, one set of affine parameters can be calculated at most only once.

In History-based Affine Prediction (Affine HMVP), motion information of the current CU can be used to update the affine HMVP table after coding an affine coded CU. Similar to the regular HMVP table updating process, when a new motion candidate is added to the table, a constrained first in and first out (FIFO) rule is utilized where a redundancy check is first applied to find whether an identical affine HMVP is included in the table. If the identical affine HMVP is found, the identical affine HMVP is removed from the table and all the affine HMVP candidates behind the identical affine HMVP are moved forward, i.e., with indices reduced by 1. The affine HMVP table size can be set to 5, same as the sub-block merge list size, and the table can be reset at the beginning of a CTU row.

In one example, for each entry of the affine HMVP table, the following motion information can be stored. Exemplary memory requirements for the motion information can be listed as follows:

| | |
|---|---|
| (a) Affine CPMVs MV0, MV1, MV2 for 2 reference lists | (36 bits * 2 * 3) |
| (b) Reference index of List 0 and/or List 1 | (4 bits * 2) |
| (c) Inter prediction direction (L0, L1, or Bi-pred) | (2 bits) |
| (d) Affine type, whether 4-parameter or 6-parameteer affine | (1 bit) |
| (e) Position (x, y) | (16 bits * 2) |
| (f) CU Width and height | (5 bits * 2) |
| (g) GBI index (optional) | (3 bits) |

Thus, a total memory requirement can be 36*2*3+4*2+2+1+16*2+5*2+3=272 bits.

Accordingly, the memory requirements for affine HMVP table of different sizes can be as follows:

| (a) Table size 1: 272 bits | ~34 bytes |
|---|---|
| (b) Table size 4: 1088 bits | ~136 bytes |
| (c) Table size 5: 1360 bits | ~170 bytes |

In some embodiments, an affine CPMV can be copied from an affine HMVP. The affine HMVP candidates can be directly added to the affine merge list or affine AMVP candidate lists as additional candidates. The affine HMVP candidates can be added after the constructed affine candidates and before the zero MV candidates. In one embodiment, no pruning check is performed when the Affine HMVP candidates are added to the affine merge list. For example, adding the affine HMVP candidates directly to the affine merge list means that CPMVs of the affine HMVP candidates can be applied to the current CU directly regardless of a shape and a size of the history block.

In some embodiments, the affine model in the affine HMVP candidate can be inherited to generate the affine merge candidate or affine AMVP candidate. Similar to the affine inheritance from spatial neighbors, the inheritance from the affine HMVP can use a position, a block width and/or a height, and CPMVs stored in an affine HMVP buffer to generate the affine motion information.

In some embodiments, affine inheritance from spatial neighbors can be replaced with inheritance from affine HMVP. The inherited affine merge candidates and inherited affine AMVP candidates can be derived from the left and above neighboring blocks coded in affine mode, such as in VTM3. For example, the inherited affine merge candidates and inherited affine AMVP candidates that are derived from the left and above neighboring blocks coded in affine mode can be replaced with inherited candidates derived from the affine HMVP. The affine merge and AMVP candidates inherited from affine HMVP can take the same positions as the current inherited affine candidates. A maximum of two inherited candidates from affine HMVP can be allowed in both affine merge and affine AMVP in one embodiment.

Entries in affine HMVP tables can be checked starting from the latest entry, and only if an affine HMVP candidate is neighboring to the current CU, the affine HMVP candidate can be used to derive the inherited candidate. Whether the affine HMVP candidate is a neighbor of the current CU can be determined because position and size information are stored in the affine HMVP table. For the affine HMVP candidates that are identified as the neighbors of the current CU, a width, a height, and CPMVs of the affine HMVP candidate can then be used to derive the CPMVs of the current CU, for example. in the same way as the current affine inheritance method in VTM3.

In some embodiments, affine inheritance from an affine HMVP can be combined with affine inheritance an from above CTU using a motion data line buffer. For example, in addition to the affine inheritance from affine HMVP as mentioned above, affine inheritance from the motion data line buffer can be also applied for blocks located adjacent to a top of a current CTU boundary.

When the candidate CU for affine motion data inheritance is positioned above a CTU line, the MVs of bottom-left and bottom-right sub-blocks in the line buffer instead of the CPMVs can be used for the affine MVP derivation. In this way, the CPMVs are only stored in a local buffer. If the candidate CU is 6-parameter affine coded, the affine model can be degraded to a 4-parameter model. Since the sub-block MV represents the motion at the center of the sub-block, the distance of two corner sub-block MVs at the bottom of a candidate PU is neiW-4, where neiW is a width of the candidate PU. To avoid division by (neiW-4), which may not be power of 2, a rough distance neiW is used for inheritance. The coordinates of bottom-left and bottom-right corners are set to (xNb, yNb+neiH) and (xNb+neiW, yNb+neiH) for inheritance.

Figure 12:
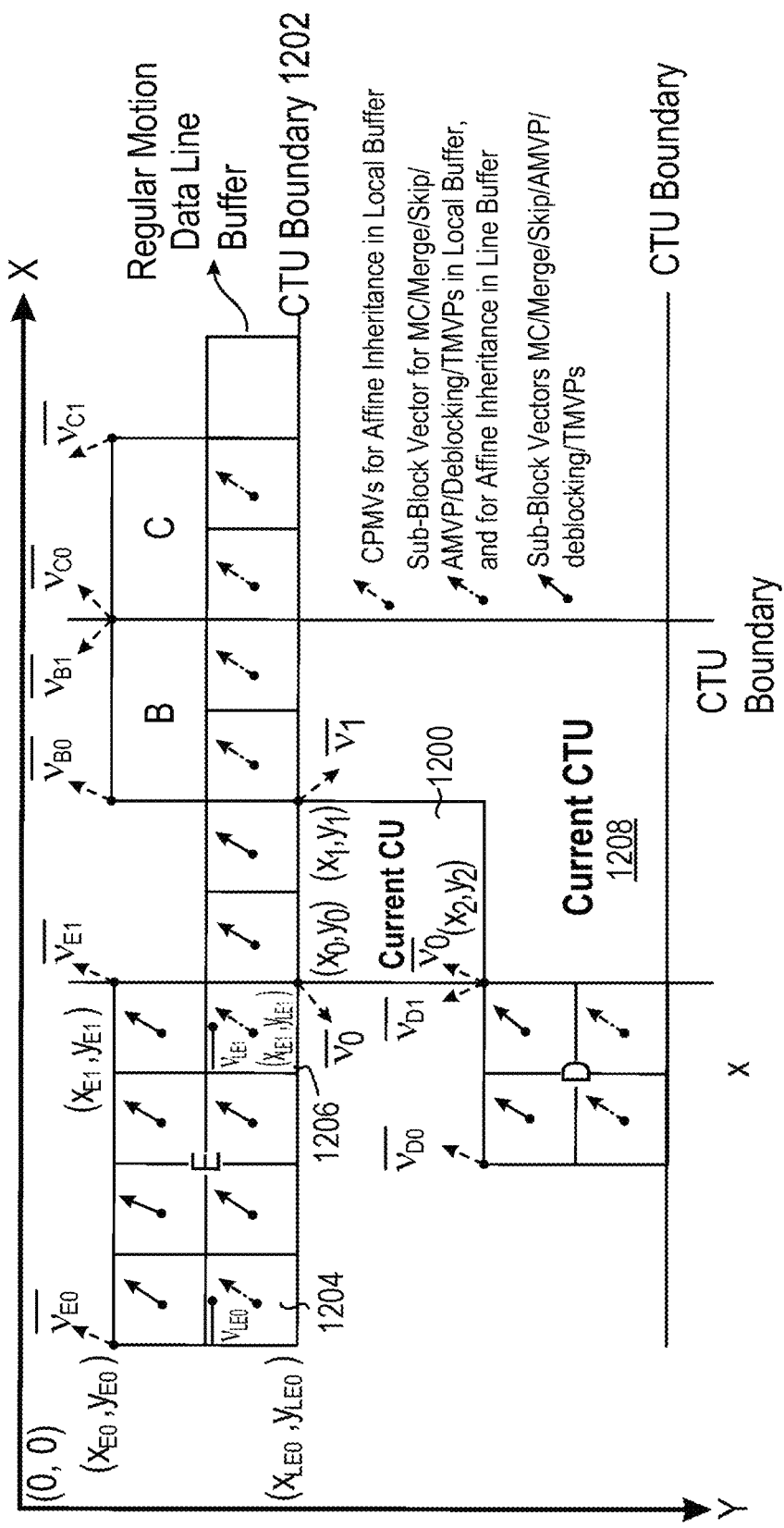
FIG. 12 shows an exemplary embodiment of affine inheritance from affine History-based Motion Vector Prediction (HMVP) in accordance with an embodiment.

As shown in FIG. 12, along the top CTU boundary 1202, the bottom-left and bottom right sub-block motion vectors (MVs) of a CU (e.g., CU E and CU B) can be used for various purposes and stored in a line buffer. The bottom-left and bottom right sub-block MVs can also be used for affine inheritance of neighboring affine CUs in bottom CTUs (e.g., current CTU 1208). For example in CU E of FIG. 12, the bottom-left and bottom right corner sub-block MVs $\vec{V}_{LE0}$ 1204 and $\vec{V}_{LE1}$ 1206 (marked in dashed arrows) of CU E are stored in the line buffer, and can be used for the affine inheritance, merge/skip/AMVP/TMVP list derivation of neighboring CUs (e.g., current CU 1200) in bottom CTUs, and de-blocking.

The control point vectors $\vec{v}_0$ and $\vec{v}_1$ of a current CU 1200 can be derived by using the 4-parameter model by Eq. (8) and (9).

$$\begin{cases} v_{0x} = \frac{(v_{LE1x} - v_{LE0x})}{(x_{LE1} - x_{LE0})}(x_0 - x_{LE0}) - \frac{(v_{LE1y} - v_{LE0y})}{(x_{LE1} - x_{LE0})}(y_0 - y_{LE0}) + v_{LE0x} \\ v_{0y} = \frac{(v_{LE1y} - v_{LE0y})}{(x_{LE1} - x_{LE0})}(x_0 - x_{LE0}) + \frac{(v_{LE1x} - v_{LE0x})}{(x_{LE1} - x_{LE0})}(y_0 - y_{LE0}) + v_{LE0y} \end{cases} \quad \text{Eq. (8)}$$

$$\begin{cases} v_{1x} = \frac{(v_{LE1x} - v_{LE0x})}{(x_{LE1} - x_{LE0})}(x_1 - x_{LE0}) - \frac{(v_{LE1y} - v_{LE0y})}{(x_{LE1} - x_{LE0})}(y_1 - y_{LE0}) + v_{LE0x} \\ v_{1y} = \frac{(v_{LE1y} - v_{LE0y})}{(x_{LE1} - x_{LE0})}(x_1 - x_{LE0}) + \frac{(v_{LE1x} - v_{LE0x})}{(x_{LE1} - x_{LE0})}(y_1 - y_{LE0}) + v_{LE0y} \end{cases} \quad \text{Eq. (9)}$$

If the current CU 1200 uses the 6-parameter affine motion model, the control point vectors $\vec{v}_2$ can be derived by Eq. (10).

$$\begin{cases} v_{2x} = \frac{(v_{LE1x} - v_{LE0x})}{(x_{LE1} - x_{LE0})}(x_2 - x_{LE0}) - \\ \quad \frac{(v_{LE1y} - v_{LE0y})}{(x_{LE1} - x_{LE0})}(y_2 - y_{LE0}) + v_{LE0x} \\ v_{2y} = \frac{(v_{LE1y} - v_{LE0y})}{(x_{LE1} - x_{LE0})}(x_2 - x_{LE0}) + \\ \quad \frac{(v_{LE1x} - v_{LE0x})}{(x_{LE1} - x_{LE0})}(y_2 - y_{LE0}) + v_{LE0y} \end{cases} \quad \text{Eq. (10)}$$

The coordinates of the bottom-left and bottom-right sub-blocks can satisfy the conditions illustrated in Eq. (11).

$$\begin{cases} x_{LE0} = x_{E0} \\ x_{LE1} = x_{E1} \\ y_{LE0} = y0 \\ y_{LE1} = y1 \end{cases} \quad \text{Eq. (11)}$$

In some embodiments, an affine HMVP can be stored with affine parameters. The affine HMVP buffer can be constructed similar to the methods described above, but instead of storing the affine CPMV values, the affine parameters can be stored in each affine HMVP entry. The affine inheritance can be done using the affine parameters from affine HMVP to generate affine motion information for affine merge or affine AMVP candidates.

History-based Affine Merge Candidates (HAMC) can be added into the sub-block-based merge candidate list. After decoding an affine-coded CU, a set of affine parameters {a, b, c, d} for the two lists and the associated reference indices can be put into an affine parameter history table.

An HAMC can be derived by combining a set of affine parameters stored in the table and the MV of a neighboring 4×4 block serving as the base MV. In a formulating way, the MV of the current block at position (x, y) can be calculated by Eq. (12).

$$\begin{cases} mv^h(x, y) = a(x - x_{base}) + c(y - y_{base}) + mv^h_{base} \\ mv^v(x, y) = b(x - x_{base}) + d(y - y_{base}) + mv^v_{base} \end{cases} \quad \text{Eq. (12)}$$

$(mv^h_{base}, mv^v_{base})$ represents the MV of a neighboring 4×4 block. $(x_{base}, y_{base})$ represents the center position of the neighboring 4×4 block. (x, y) can be the top-left, top-right, or bottom-left corner of the current block to obtain the CPMVs.

HAMCs derived from stored affine parameters and MVs from spatial neighboring blocks can be put into the sub-block-based merge candidate list after the first constructed affine merge candidate. For each set of stored affine parameters, the first valid neighboring 4×4 block with the same inter-prediction direction and reference indices as those associated with the set of affine parameters can be used to derive the HAMC.

HAMCs derived from stored affine parameters and MVs from temporal neighboring block can be put into the sub-block-based before the zero candidate. For each set of stored affine parameters, the TMVP can be scaled to the reference picture that the parameters refer to, to derive the HAMC.

Further, each parameter can be stored as an 8-bit signed integer. Up to 6 affine parameter sets can be stored. Therefore, the affine parameter history table can be quite small, e.g., only 6×(8×4×2+8)=432 bits (42 bytes).

In affine merge prediction as mentioned above, two kinds of affine merge candidates can be included. The two kinds of affine merge candidates are (a) inherited affine merge candidates which inherit an affine model from an affine coded spatial neighboring block; and (b) constructed affine merge candidates which are constructed by copying MVs from spatial neighbors to corresponding adjacent control points.

For constructed affine merge candidates, copying MV values from neighboring minimum blocks to corresponding control points may lose prediction accuracy if a neighboring minimum block belongs to an affine coded coding block.

The methods described in the present disclosure may be used separately or combined in any order. Further, in the embodiments, an encoder, and a decoder may be implemented by processing circuitry (e.g., one or more processors or one or more integrated circuits). In one example, the one or more processors execute a program that is stored in a non-transitory computer-readable medium. Further, the term of a block may be interpreted as a prediction block, a coding block, or a coding unit, i.e., CU.

The present disclosure is directed to deriving affine merge candidates. The affine merge candidates that are derived can be in addition to inherited affine merge candidates and constructed affine merge candidates.

In some embodiments, affine model inheritance and control point construction can be combined. Motion information for a control point of a block can be derived from a selected spatial neighboring affine coded block of the control point using affine model inheritance (or affine inheritance). Each control point of the block can be derived individually using a spatial neighboring affine coded block of the respective control point. A combination of two or three of the derived control points can be used to derive an affine merge candidate to represent the affine model of the block.

In some embodiments, the motion information for the control point of the block can be derived by copying a translational MV of a first available neighboring block of the control point in response to none of the neighboring blocks of the control point being affine coded.

Figure 13:
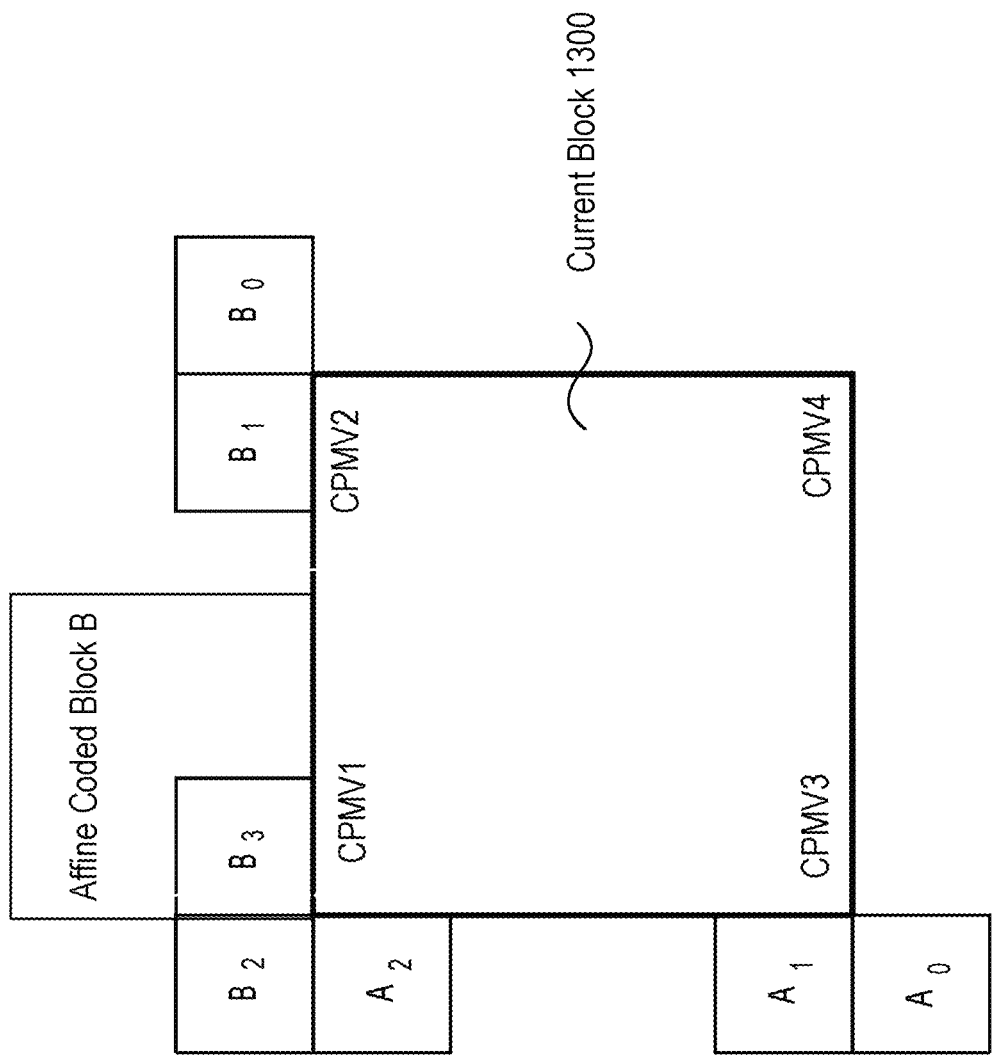
FIG. 13 shows an exemplary embodiment of deriving a CPMV of a control point from spatial neighboring blocks using affine inheritance.

In one example, as depicted in FIG. 13, a first control point motion vector CPMV1 (also referred to as first candidate CPMV1) of a first control point of a current block 1300 can be derived from a first neighboring coding block, such as one of spatial neighboring blocks B2, B3, and A3 of the first control point. For example, if B3 is selected, and B3 belongs to coding block B which is affine coded, a first affine model of the coding block B can be used to derive CPMV1 using affine inheritance. A derivation process can be denoted as in Eq. (13), where $MV^h_{B0}$ and $MV^v_{B0}$ are horizontal and vertical components of a top-left CPMV of the coding block B; $x_{B0}$ and $y_{B0}$ represent locations of a top-left control point of the coding block B; $a_B$, $b_B$, $c_B$, $d_B$ are affine parameters of the coding block B; x, y represent locations of a current control point (e.g., the first control point) that correspond to CPMV1.

$$\begin{cases} CPMV1^h(x, y) = a_B(x - x_{B0}) + c_B(y - y_{B0}) + MV^h_{B0} \\ CPMV1^v(x, y) = b_B(x - x_{B0}) + d_B(y - y_{B0}) + MV^v_{B0} \end{cases} \quad \text{Eq. (13)}$$

Similarly, a second control point motion vector CPMV2 (or second candidate CPMV2) of a second control point can be derived from a second neighboring coding block of the second control point, such as one of spatial neighboring blocks B0 or B1 of the second control point. The second neighboring coding block can belong to a second affine coded block with a second affine model. The second affine model can be used to derive CPMV2 using affine inheritance. A third control point motion vector CPMV3 (or third candidate CPMV3) of a third control point can be derived from a third neighboring coding block from one of spatial neighboring blocks A0 or A1 of the third control point. The third neighboring coding block can belong to a third affine coded block with a third affine model. The third affine model can be used to derive CPMV3 using affine inheritance.

Figure 14:
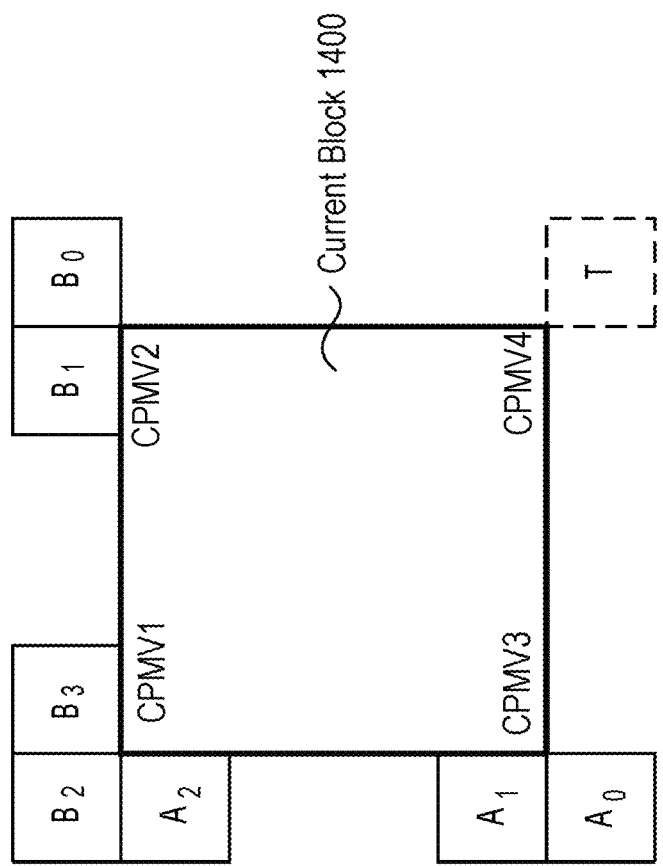
FIG. 14 shows locations of candidates for a combination of inherited affine merge mode and constructed affine merge mode.

In one embodiment, CPMV derived from affine inheritance and CPMV derived by copying a translational MV of a neighboring block can be combined to construct the affine merge candidate. FIG. 14 illustrates exemplary locations of candidate positions for combined affine inheritance and construction merge mode. As illustrated in FIG. 14, for CPMV1, the neighboring blocks {B2, B3, A2} can be checked sequentially and an affine model of a first available affine coded block can be used for affine model inheritance. Otherwise, construction merge mode can be applied, for example if none of B2, B3, A2 belongs to any affine coded block. In the construction merge mode, when none of B2, B3, and A2 belongs to any affine coded block, first available translational MVs of the neighboring blocks B2, B3, and A2 can be used. For example, CPMV1 can be constructed by copying the first available translational MVs from one of the neighboring blocks B2, B3 and A2. For CPMV2, the B1->B0 blocks can be checked to derive the CPMV2, and for CPMV3, the A1->A0 blocks can be checked to derive CPMV3. For CPMV4, a temporal motion vector predictor (TMVP) can be used as a predictor of CPMV4 if the TMPV is available.

In some embodiments, the selection and checking orders of the neighboring blocks at different control points can be changed. For example, referring to FIG. 14, in order to derive CPMV1 for CP1 (control point 1), {A2, B2, B3} can be sequentially checked or {A2, B3} can be sequentially checked.

In some embodiments, when the affine inheritance is used to derive a CPMV, the affine inheritance only derives a single CPMV for a corresponding control point by using an affine model inherited from a selected spatial neighboring coding block. For example, for CPMV1, if B3 is the first available affine block among B2, B3, and A2, the affine model of the block that includes B3 can be used for affine inheritance. The CPMV1 can be generated based on the affine model of the first available affine block.

In an embodiment, all four control points of the current block can be used as candidate control points to derive the affine merge candidate, for example combined, to derive affine merge candidates based on motion information of the four control points (or four candidate control points). This method can be utilized, for example when at least one of the CPMVs of the four control points can be derived from affine inheritance. CPMV4 can be derived by copying translational MV from a temporal candidate (or TMVP). Different combinations of control point MVs can be applied to derive the affine merge candidates. For example, the following combinations of control point MVs can be used: {CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}.

A combination of three CPMVs can construct a 6-parameter affine merge candidate and a combination of two CPMVs can construct a 4-parameter affine merge candidate. Various construction orders can be utilized. In one example, the construction of the affine merge candidates can be performed in the following order: {CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}.

In some embodiments, only three control points (or three candidate control points) of the current block 1400 with corresponding spatial neighboring $CMPV_s$, $CPMV_k$ (k=1, 2, 3), can be used for the combined affine model inheritance and construction merge mode. In an embodiment, the method is only used when at least one of the three control points can be derived from affine inheritance. Different combinations of control point MVs can be applied to derive the affine merge candidates. For example, the following combinations of the control MVs can be used: {CPMV1, CPMV2, CPMV3}, {CPMV1, CPMV2}, {CPMV1, CPMV3}. A combination of three CPMVs can construct a 6-parameter affine merge candidate and a combination of two CPMVs can construct a 4-parameter affine merge candidate. Various construction orders can be utilized. In one example, the construction of the affine merge candidates is preformed in the following order: {CPMV1, CPMV2, CPMV3}, {CPMV1, CPMV2}, {CPMV1, CPMV3}.

Affine merge candidates can be derived through a combination of affine model inheritance and construction merge mode when one or more conditions are met. In an embodiment, in order to derive the affine merge candidates through a combination of affine model inheritance and construction merge mode, a condition is that at least two control points of the current block 1400 are derived by affine model inheritance. In an embodiment, in the present disclosure, a condition is that all the available CPMVs are derived by affine model inheritance. In an embodiment, in order to derive the affine merge candidates through a combination of affine model inheritance and construction merge mode, a condition is that all the available control points have the same reference indices, i.e., all the available control points of the current block 1400 refer to a same reference picture.

A selection of an affine model for a control point from multiple neighboring blocks of the control point can be different from an affine model when a first available affine model in a checking order is selected in other embodiments. The affine model selection can follow a different rule. For example, an affine coded block with a largest size among the neighboring blocks of the control point can be selected to derive a corresponding CPMV of the control point. In one embodiment, a size of each of the affine coded neighboring blocks can be determined by a number of samples in the respective affine coded neighboring block. The size can be defined as a width multiplied by a height of the respective affine coded neighboring block. In one embodiment, when two neighboring affine coded blocks have a same size an additional rule can be applied, for example a first available neighboring affine coded block in a predefined checking order can be used.

Figure 15:
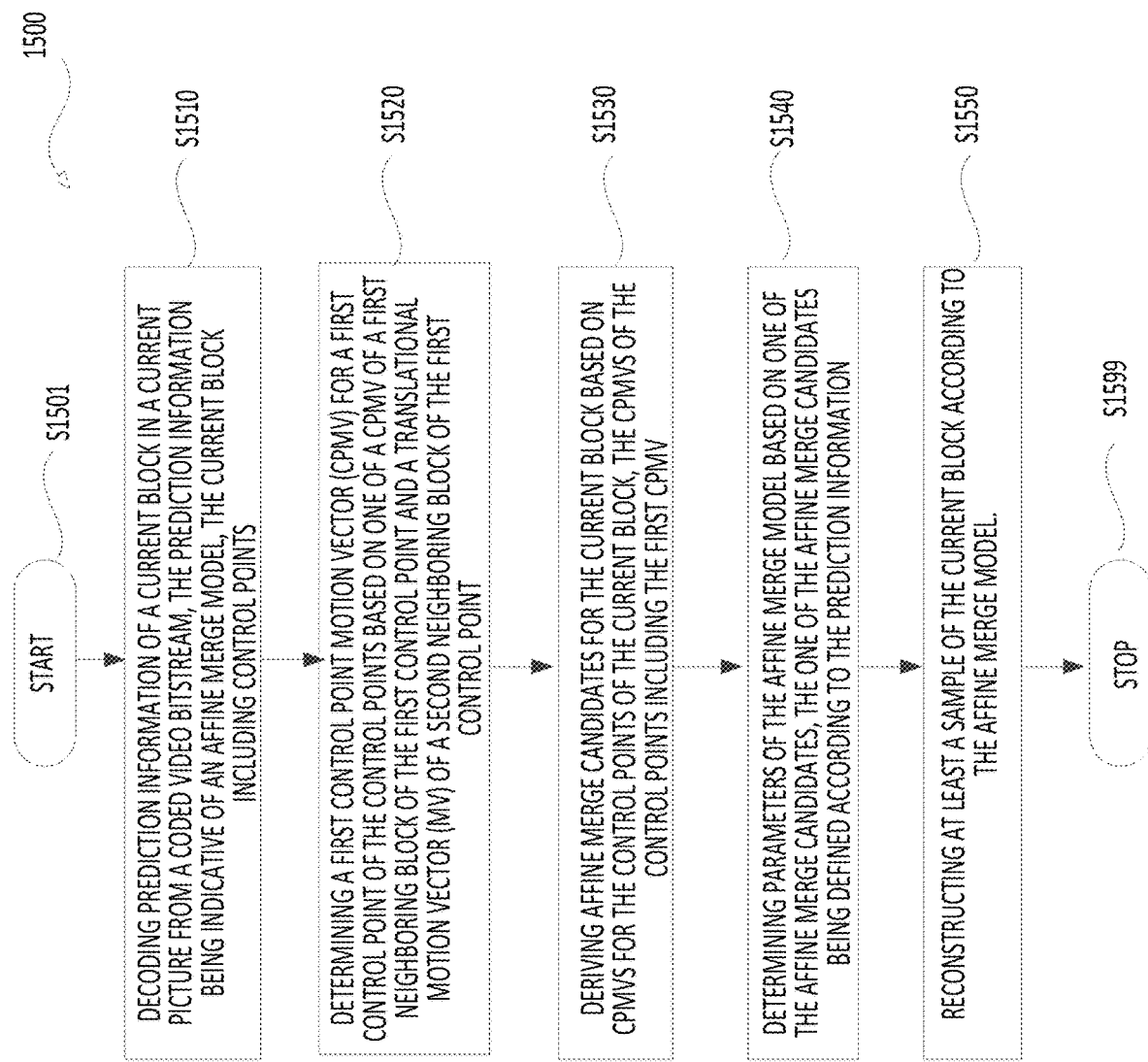
FIG. 15 shows a flow chart outlining a process example according to some embodiments of the disclosure.

FIG. 15 shows a flow chart outlining a process (1500) according to an embodiment of the disclosure. The process (1500) can be used in the reconstruction of a block, so to generate a prediction block for the block under reconstruction. In various embodiments, the process (1500) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1500) is implemented in software instructions, thus when the processing circuitry executes the software instructions, the processing circuitry performs the process (1500). The process starts at (S1501) and proceeds to (S1510).

At (S1510), prediction information of a current block in a current picture can be decoded from a coded video bitstream. The prediction information can be indicative of an affine merge model, and the current block includes a plurality of control points.

At (S1520), a first control point motion vector (CPMV) for a first control point of the control points can be determined based on a CPMV of a first neighboring block of the first control point or a translational motion vector (MV) of a second neighboring block of the first control point. In some embodiments, a CPMV for a control point of a CU can be derived from a selected spatial neighboring affine coded block of the control point using affine model inheritance. Each control point of the CU can be derived individually using a spatial neighboring affine coded block of the respective control point. A combination of two or three of the derived control points can derive an affine merge candidate to represent the affine model of the current block.

In some embodiments, a CPMV for the control point of the CU can be derived by copying a translational MV of a first available neighboring block of the control point in response to none of the neighboring blocks of the control point being affine coded.

In some embodiments, for a CPMV of the control point of the CU, neighboring blocks can be checked sequentially and an affine model of a first available affine coded block can be used to derive the CPMV of the control point. If none of the neighboring blocks of the control point is affine coded, the CPMV of the control point can be derived by copying translational MVs of a first available block of the neighboring blocks.

At (S1530), affine merge candidates for the current block can be derived based on CPMVs for the control points of the current block, and the CPMVs of the control points include the first CPMV. A combination of three CPMVs can construct a 6-parameter affine merge candidate and a combination of two CPMVs can construct a 4-parameter affine merge candidate.

At (S1540), parameters of the affine merge model can be determined based on one of the affine merge candidates. The one of the affine merge candidates can be defined according to the prediction information. The parameters of the affine merge model can be used to transform between the current block and a reference block in a reference picture that has been reconstructed.

At (S1550), at least a sample of the current block can be reconstructed according to the affine merge model.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
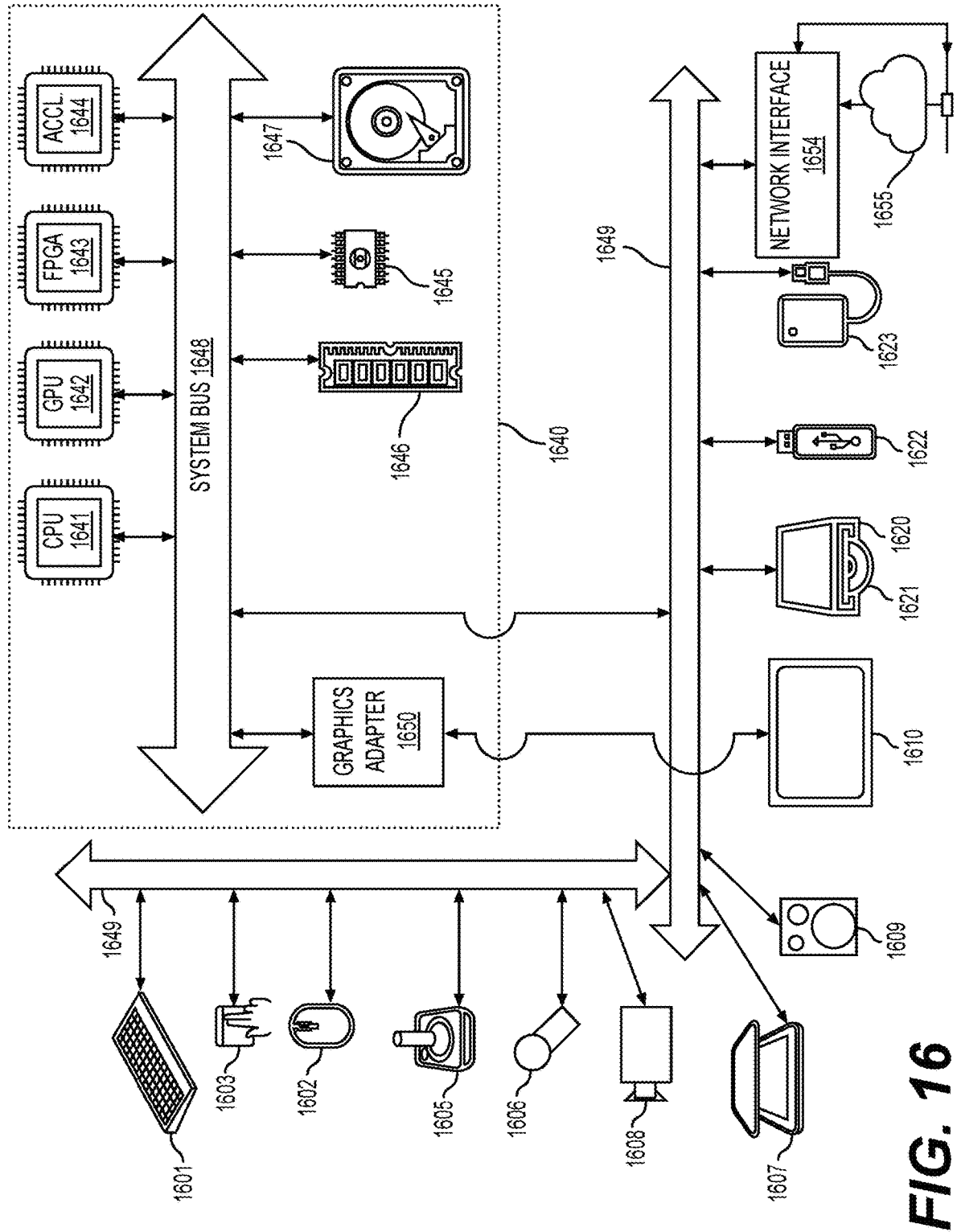
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   decoding prediction information of a current block in a current picture from a coded video bitstream, the prediction information being indicative of an affine merge model, the current block including control points that are derived from at least two of four candidate control points of the current block;
   determining a first candidate control point motion vector (CPMV) of the first control point of the control points from at least two CPMVs of a first neighboring block of the first control point;
   determining a second candidate CPMV of a second control point of the control points by copying a translational motion vector (MV) of a temporal motion vector predictor;
   deriving affine merge candidates for the current block based on candidate CPMVs for the control points of the current block, the candidate CPMVs of the control points including the first candidate CPMV and the second candidate CPMV;

determining parameters of the affine merge model based on one of the affine merge candidates, the one of the affine merge candidates being defined according to the prediction information, the parameters of the affine merge model being used to transform between the current block and a reference block in a reference picture that has been reconstructed; and reconstructing at least a sample of the current block according to the affine merge model.

2. The method of claim 1, wherein:

the prediction information indicates a selection of the affine merge candidates, and the method further includes defining the one of the affine merge candidates in accordance with the prediction information.

3. The method of claim 2, wherein the determining the first candidate CPMV for the first control point further comprises one of:

determining the first candidate CPMV for the first control point based on at least two CPMVs of a first affine coded block among neighboring blocks of the first control point according to a checking order; and determining the first candidate CPMV for the first control point based on a translational MV of a first available block among the neighboring blocks of the first control point according to the checking order, responsive to none of the neighboring blocks of the first control point being affine coded.

4. The method of claim 1, wherein the control points of the current block are derived from at least three candidate control points of the current block, and the candidate CPMVs for at least two of the control points of the current block are derived from CPMVs of neighboring blocks of the at least two of the control points.

5. The method of claim 1, wherein each of the candidate CPMVs of the control points of the current block refers to the reference picture.

6. The method of claim 1, wherein the first neighboring block of the first control point is a largest affine coded block of neighboring affine coded blocks of the first control point, and the determining the first candidate CPMV for the first control point further comprises determining the first candidate CPMV for the first control point based on the at least two CPMVs of the largest affine coded block of the neighboring affine coded blocks of the first control point.

7. An apparatus for video decoding, comprising:

processing circuitry configured to:

decode prediction information of a current block in a current picture from a coded video bitstream, the prediction information being indicative of an affine merge model, the current block including control points that are derived from at least two of four candidate control points of the current block;

determine a first candidate control point motion vector (CPMV) of the first control point of the control points from at least two CPMVs of a first neighboring block of the first control point;

determine a second candidate CPMV of a second control point of the control points by copying a translational motion vector (MV) of a temporal motion vector predictor;

derive affine merge candidates for the current block based on candidate CPMVs for the control points of the current block, the candidate CPMVs of the control points including the first candidate CPMV and the second candidate CPMV;

determine parameters of the affine merge model based on one of the affine merge candidates, the one of the affine merge candidates being defined according to the prediction information, the parameters of the affine merge model being used to transform between the current block and a reference block in a reference picture that has been reconstructed; and reconstruct at least a sample of the current block according to the affine merge model.

8. The apparatus of claim 7, wherein:

the prediction information indicates a selection of the affine merge candidates, and the processing circuitry is further configured to define the one of the affine merge candidates in accordance with the prediction information.

9. The apparatus of claim 8, wherein the processing circuitry is further configured to perform one of:

determine the first candidate CPMV for the first control point based on at least two CPMVs of a first affine coded block among neighboring blocks of the first control point according to a checking order; and determine the first candidate CPMV for the first control point based on a translational MV of a first available block among the neighboring blocks of the first control point according to the checking order, responsive to none of the neighboring blocks of the first control point being affine coded.

10. The apparatus of claim 7, wherein the control points of the current block are derived from at least three candidate control points of the current block, and the candidate CPMVs for at least two of the control points of the current block are derived from CPMVs of neighboring blocks of the at least two of the control points.

11. The apparatus of claim 7, wherein each of the candidate CPMVs of the control points of the current block refers to the reference picture.

12. The apparatus of claim 7, wherein the first neighboring block of the first control point is a largest affine coded block of neighboring affine coded blocks of the first control point, and the processing circuitry is configured to determine the first candidate CPMV for the first control point by determining the first candidate CPMV for the first control point based on the at least two CPMVs of the largest affine coded block of the neighboring affine coded blocks of the first control point.

13. A non-transitory computer-readable medium storing instructions which when executed by a computer for video decoding cause the computer to perform:

decoding prediction information of a current block in a current picture from a coded video bitstream, the prediction information being indicative of an affine merge model, the current block including control points that are derived from at least two of four candidate control points of the current block;

determining a first candidate control point motion vector (CPMV) of the first control point of the control points from at least two CPMVs of a first neighboring block of the first control point;

determining a second candidate CPMV of a second control point of the control points by copying a translational motion vector (MV) of a temporal motion vector predictor;

deriving affine merge candidates for the current block based on candidate CPMVs for the control points of the current block, the candidate CPMVs of the control points including the first candidate CPMV and the second candidate CPMV;

determining parameters of the affine merge model based on one of the affine merge candidates, the one of the affine merge candidates being defined according to the prediction information, the parameters of the affine merge model being used to transform between the current block and a reference block in a reference picture that has been reconstructed; and reconstructing at least a sample of the current block according to the affine merge model.

\* \* \* \* \*